United States Patent [19]

Coates

[11] 4,415,235
[45] Nov. 15, 1983

[54] SIGHT GLASS/LENS MOUNTING ASSEMBLY

[76] Inventor: James H. Coates, 2125 2nd St., Douglas, Ak. 99824

[21] Appl. No.: 273,013

[22] Filed: Jun. 12, 1981

[51] Int. Cl.$^3$ .............................................. G02B 7/02
[52] U.S. Cl. ................................... 350/319; 350/252; 350/589
[58] Field of Search ............... 350/319, 252, 589, 590, 350/318

[56] References Cited

FOREIGN PATENT DOCUMENTS

| 380255 | 7/1907 | France | 350/252 |
| 924998 | 8/1947 | France | 350/252 |

*Primary Examiner*—Jon W. Henry

[57] ABSTRACT

A window/lens mounting assembly that provides a method for securing both a lens component and a separate window element through the use of a single retaining ring. Said window, such as glass or plastic, serves both as a protective shield and a clear opening that allows light to pass through said lens. Said retaining ring secures said lens with retaining members, such as screws, which apply pressure at right angles to the axis of said lens. Additional retaining members secure said retaining ring to a retaining ring holder also by application of pressure at right angles to the axis of the said lens. Said additional retaining members also act against said retaining ring, which in turn, secures said window in place by applying force parallel to the axis of said lens. The window, in turn, is fixed tightly against a compression gasket between said window and a face plate. Thus a water tight seal is formed between said window and said lens.

2 Claims, 4 Drawing Figures

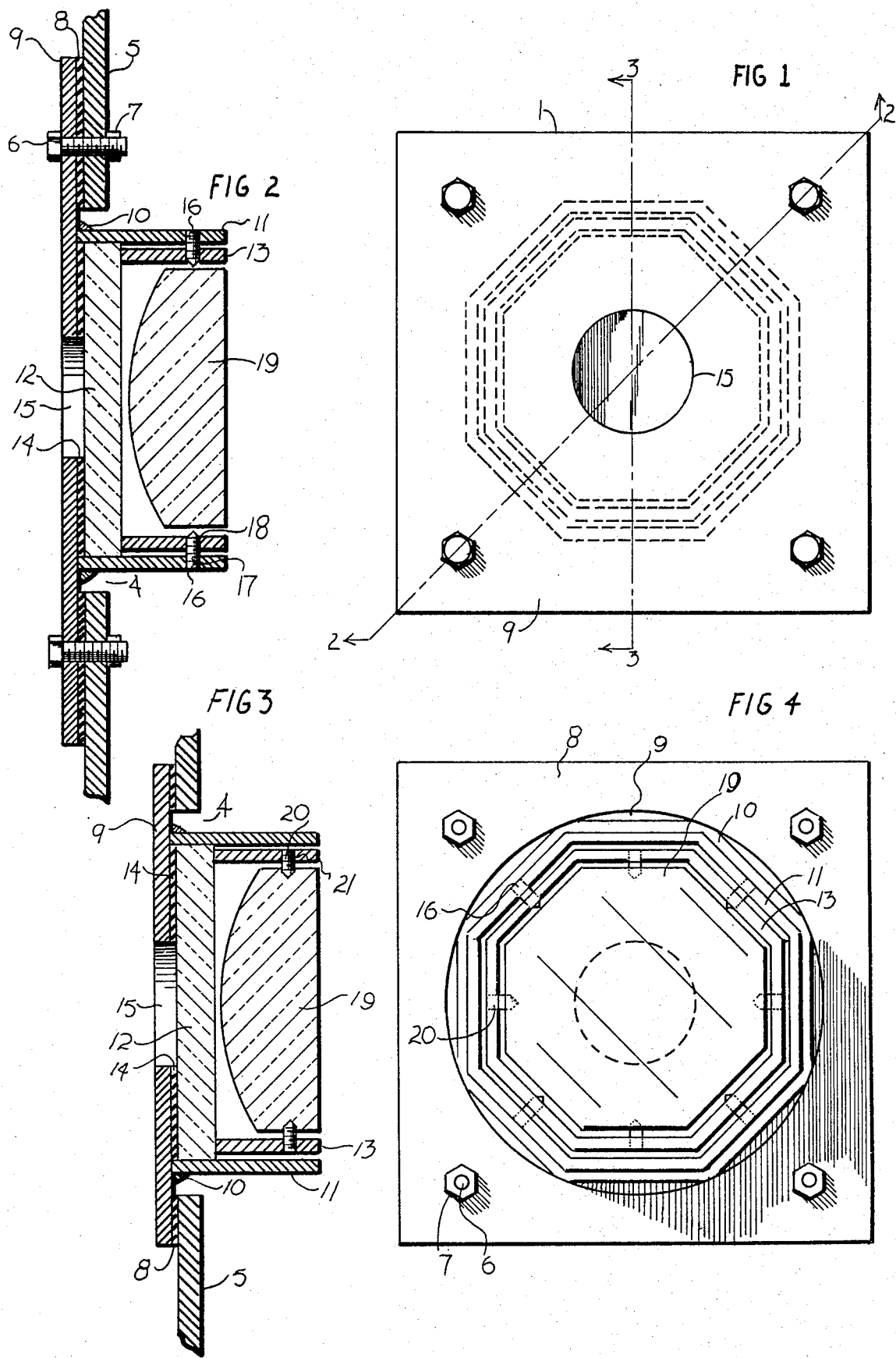

SIGHT GLASS/LENS MOUNTING ASSEMBLY

This invention relates to sight glass assemblies and lens mounting and has as its object a novel way of lens mounting in conjunction with a sight glass assembly, while being especially adapt for use with the wall of a vessel.

A further object is to provide protection of the enclosed vessel from unwanted elements or forces of nature by means of a sight glass assembly, whose components allow the passage of light through the assembly by the use of a clear viewing window, secured against a sealing gasket by means of a novel retaining ring, while preventing the leakage of foreign material into the sight glass/lens mounting assembly.

Another object of the sight glass/lens mounting assembly is to provide protection for the lens component which is secured to the sight glass/lens mounting assembly. The clear viewing window positioned in front of the lens component allows for both the passage of light through the lens and protection of the lens against elements harmful to the optical precision of the lens.

Another object of the sight glass/lens mounting assembly is to provide a method of holding the lens element in place, through the use of the dual purpose retaining ring. I have provided and will explain in detail later, a method whereby the lens and clear viewing window are both held in place by the use of of a retaining ring within the sight glass/lens mounting assembly.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:

FIG. 1 is an outside elevational view of my sight glass/lens mounting assembly installed.

FIG. 2 is a view taken on the line 2—2 of FIG. 1

FIG. 3 is a view taken on the line 3—3 of FIG. 1

FIG. 4 is an inside elevational view of my sight glass/lens mounting assembly installed.

In the accompanying drawings I have used the number 1 to designate the sight glass/lens mounting assembly and I have provided an opening 4 in the vessel in which the sight glass/lens mounting assembly 1 is positioned. The sight glass/lens mounting assembly 1 is secured to the vessel 5 by means of bolts 6 locking into nuts 7 which have been welded or otherwise secured to the inside of vessel 5. A gasket 8 whose outer boundaries are contoured to the external boundaries of the face plate 9 of sight glass/lens mounting assembly 1 and whose I.D. just barely touches the apex of the octagonal weld 10 seals the sight glass/lens mounting assembly 1 onto the vessel 5 in such a manner as to form a water tight seal. Glue applied to the face plate 9 and gasket 8 contact and a sealing compound applied to the vessel 5 and gasket 8 contact assist in forming a water tight seal.

The octagonal weld 10 fastens together face plate 9 and octagonally shaped retaining ring holder 11. It can be seen that the octagonal shape can be varied to include many other functional and useable shapes. The height of the retaining ring holder 11 varies in relation to the thickness of the clear viewing window 12 and the height of retaining ring 13 and should be able to accommodate the clear viewing window 12, retaining ring 13 and gasket 14 combination.

In FIG. 2 it is seen that the outer edge of the clear viewing window 12 extends to the inner boundaries of retaining ring holder 11 such that the retaining ring holder 11 acts as a sleeve to contain octagonally shaped clear viewing window 12. The clear viewing window 12 rests on and is sealed against a gasket 14. The gasket 14 is clamped between the clear viewing window 12 and face plate 9 forming a seal to prevent dust and other foreign matter leakage into and out of the vessel 5. The gasket 14, made of neoprene rubber or other suitable elastic material, is an important element in the sight glass/lens mounting assembly 1. Its O.D. should lie tangential to the inner boundary of retaining ring holder 11. Its I.D. is the same as the aperature 15 in the face plate 9 of the sight glass/lens mounting assembly 1. The gasket 14 is glued on one side to the metal face plate 9 while on the other side a sealing compound of clear silicone is used to seal the clear viewing window 12. The compressive forces exerted on the peripheries of the clear viewing window 12, causing an intimate sealing contact between the clear viewing window 12, the gasket 14, and face plate 9, is the result of the downward force of the retaining ring 13.

The retaining ring 13, whose outer dimensions are just slightly smaller than the inner dimension of the retaining ring holder 11, rests on the peripheries of the clear viewing window 12. A compressive force necessary for the intimate seal between the clear viewing window 12, the gasket 14, and face plate 9 is initially made by a suitable clamping arrangement. The retaining ring 13 is then locked into place by Allen wrench screws 16 which thread between the threaded bores 17 of retaining ring holder 11 and the threaded bores 18 of retaining ring 13. The Allen wrench screws 16 are placed on every other facet of the octagonally shaped retaining ring 13, thus totaling 4 in number when used to secure the octagonally shaped retaining ring 13 in its compressive hold of the clear viewing window 12.

It will be seen that the lateral thrust of the Allen wrench screws 16 into the threaded bores 18 of the retaining ring 13, while supported by the threaded bores 17 of the retaining ring holder 11, is sufficient to maintain the necessary compressive force to cause an intimate seal between the clear viewing window 12, the gasket 14, and the face plate 9.

As mentioned earlier in the brief summary of my sight glass/ lens mounting assembly, the retaining ring 13 has a dual purpose. Besides that of sight glass holder as has been explained above, it also functions as a lens mounting unit, securing lens component 19 as seen in FIGS. 3 and 4. Allen wrench, lens securing screws 20 thread through threaded bores 21 on retaining ring 13 to make contact with and secure lens component 19. The threaded bores 21 are placed on every other facet of the retaining ring 13 in a manner similar to the threaded bores 18 of the retaining ring 13.

The invention having been set forth, what is claimed as new and useful is:

1. A window and lens mounting assembly comprised of a face plate defining an aperture, a retaining ring holder secured to said face plate about said aperture, a window element within said retaining ring holder separated from said face plate by a compression gasket surrounding said aperture, a retaining ring within said retaining ring holder, means for securing said retaining ring to said retaining ring holder and pressing said retaining ring against said window element so as to compress said compression gasket, and means for securing a lens within said retaining ring.

2. A window and lens mounting assembly as set out in claim 5 wherein both said means for securing comprise screw means.

* * * * *